(12) United States Patent
Kim

(10) Patent No.: US 7,597,345 B1
(45) Date of Patent: Oct. 6, 2009

(54) STRUCTURE FOR MOUNTING CURTAIN AIRBAG

(75) Inventor: Eungman Kim, Sunwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/949,326

(22) Filed: Dec. 3, 2007

(30) Foreign Application Priority Data

Aug. 14, 2007 (KR) ................ 10-2007-0081617

(51) Int. Cl.
*B60R 21/16* (2006.01)
(52) U.S. Cl. .................................. 280/728.2
(58) Field of Classification Search ........... 280/728.2, 280/730.2
See application file for complete search history.

(56) References Cited

U.S. PATENT DOCUMENTS

2006/0255568 A1* 11/2006 Demel et al. ............. 280/728.2
2007/0273128 A1* 11/2007 Cheal ...................... 280/728.2

FOREIGN PATENT DOCUMENTS

| JP | 2000-168482 | 6/2000 |
|----|-------------|--------|
| JP | 2003-285708 | 10/2003 |
| KR | 10-2003-0097137 | 12/2003 |
| KR | 10-2005-0102213 | 10/2005 |

* cited by examiner

*Primary Examiner*—Faye M. Fleming
(74) *Attorney, Agent, or Firm*—Morgan, Lewis & Bockius LLP

(57) ABSTRACT

The present invention provides a structure for mounting a curtain airbag. According to the structure, a curtain airbag can be simply mounted to a car body by a fixing bracket and usability of the curtain airbag is maximized by guiding an airbag cushion, which is unfolded, with a guiding portion so that the airbag cushion can smoothly and rapidly expand inside while opening a head lining, without interference from a center pillar trim.

11 Claims, 4 Drawing Sheets

STRUCTURE FOR MOUNTING CURTAIN AIRBAG

CROSS-REFERENCE TO RELATED APPLICATIONS

The present application is based on, and claims priority from, Korean Application Serial Number 10-2007-0081617, filed on Aug. 14, 2007, the disclosure of which is hereby incorporated by reference herein in its entirety.

FIELD OF THE INVENTION

The present invention relates to a structure for mounting a curtain airbag, particularly a structure that effectively reduces injury to a passenger due to a collision of vehicle by smoothly and rapidly unfolding an airbag cushion.

BACKGROUND OF THE INVENTION

A curtain airbag is mounted to the internal side of a vehicle to protect a passenger, using an airbag cushion that is unfolded while opening a head lining. However, the serious problem when the airbag cushion is unfolded is that it is not smoothly unfolded due to blocking by a center pillar trim of the vehicle when the airbag cushion is unfolded down while opening the head lining.

A variety of methods have been proposed in the related art to overcome the above problem, but, according to the conventional methods, it takes a long time to unfold the airbag cushion and it is difficult to achieve sufficient effectiveness of the curtain airbag in a car crash.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

The present invention provides a structure for mounting a curtain airbag that maximizes usability of a curtain airbag by smoothly and rapidly unfolding an airbag cushion without interference from the center pillar trim, while appropriately mounting the curtain airbag to the car body.

Embodiments of the invention provide a structure for mounting a curtain airbag, in which the upper portion and the lower portion of the curtain airbag is coupled to a car body by a fixing bracket holding at least a portion of the curtain airbag. An inserting portion-to-car body is configured at the lower end portion of the fixing bracket. The inserting portion-to-car body is substantially inserted in a fixing hole formed through a portion of the car body.

The structure may include an ear-fixing portion that fixes to the car body an ear of the curtain airbag that passes through a locking hole formed at the upper portion of a holding portion of the fixing bracket. Further, the fixing bracket holds the upper portion, the lower portion, and the outside portion of the curtain airbag and has a locking hole at the upper portion of the fixing bracket while being open smoothly and rapidly to the inside of the vehicle to unfold an airbag cushion in car crash.

At least a shield may be disposed around the locking hole of the holding portion to prevent damage to the ear.

The fixing bracket may further include a guiding portion, an outward-extending portion, and a downward-extending portion. The guiding portion is formed of the lower portion extending to the inside of the vehicle from the lower portion of the holding portion, and covers the lower portion of the curtain airbag. The outward-extending portion is connected at the inside end portion of the guiding portion and extends from the inside end portion toward the car body. The downward-extending portion is connected at the outside end portion of the outward-extending portion and extends downward from the outside end portion of the outward-extending portion.

The ear-fixing means may include a cover bracket that covers and couples the end portion of the ear to the car body with a fixing bolt that is screwed into the car body through the ear and the cover bracket.

The holding portion of the fixing bracket may have a C-shaped cross-section that is open to the inside of the car, and the lower portion of the holding portion and the guiding portion may be formed in a simple plate shape facing the inside of the car.

The guiding portion connected at the lower portion of the holding portion may form a slope that is inclined down toward the inside of the car.

The fixing bracket further includes an inserting portion-to-car body comprising a neck and a protrusion portion. The protrusion portion is positioned at the distal end portion of the inserting portion-to-car body and comprises at least a protrusion at both distal ends of the protrusion portion. The neck that is relatively narrower than the width between the distal ends of the protrusions is formed between the downward-extending portion and the protrusion portion. A fixing hole may be formed at a portion of the car body in a width larger than the width of the neck but smaller than the width between the distal ends of protrusions.

According to the configuration of the present invention, a curtain airbag can be simply mounted to a car body by a C-shaped fixing bracket and usability of the curtain airbag is maximized by guiding an airbag cushion when it is unfolded, along the surface of the guiding portion so that the airbag cushion can smoothly and rapidly expand to the inside of the car while opening a head lining, without interference from a center pillar trim.

The holding portion, a guiding portion, an outward-extending portion, a downward-extending portion, and an insertion portion-to-car body may be integrally formed by bending a panel.

Further, according to the structure of the invention, when a passenger inside collides against the guiding portion, the inserting portion-to-car body is further inserted into the car body, and the outward-extending portion and downward-extending portion absorb the impact while deforming, which considerably improves safety for the passenger.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
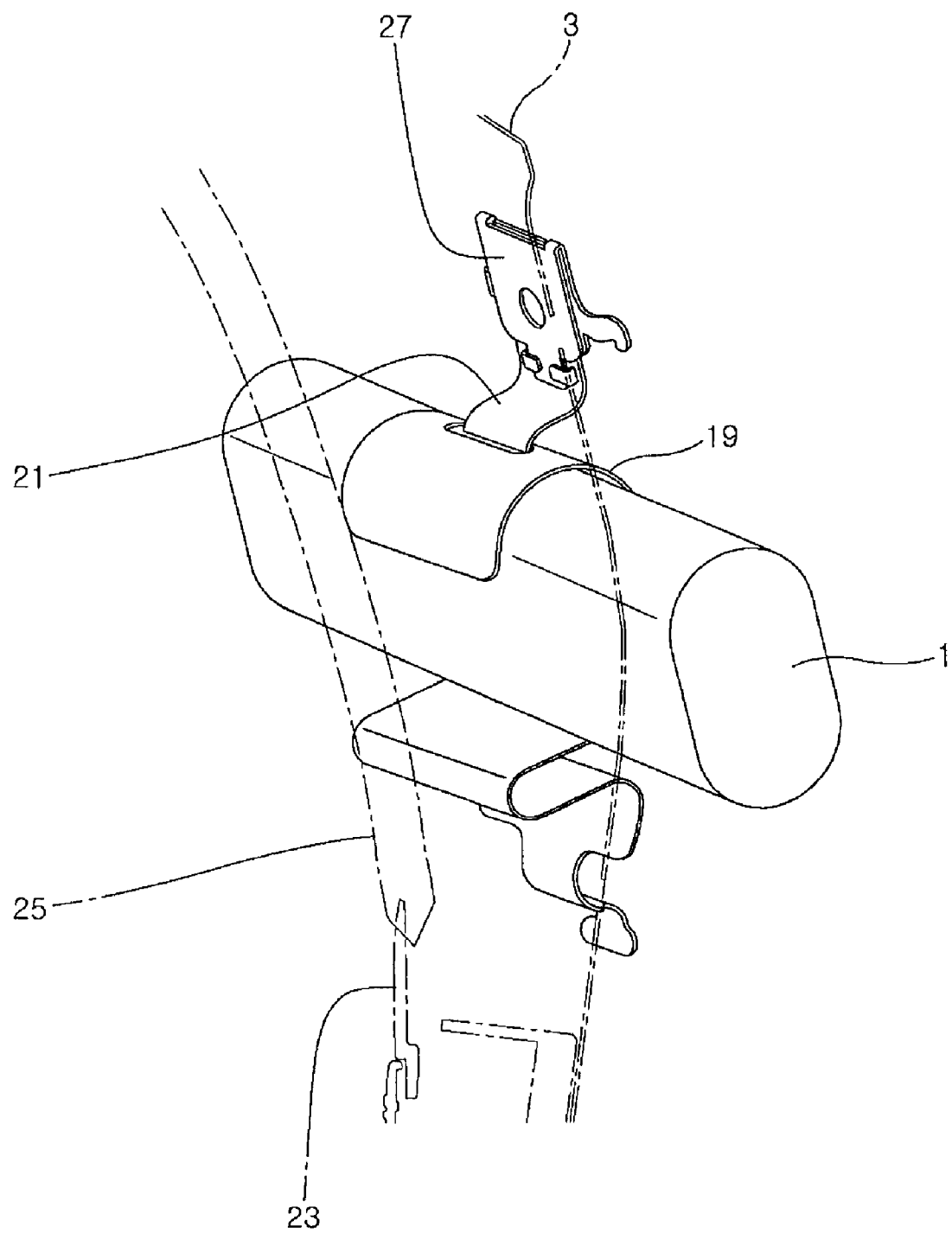
FIG. 1 is a perspective view of a structure for mounting a curtain airbag according to an embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE PREFERRED EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Referring to FIGS. 1 to 4, a structure for mounting a curtain airbag according to an embodiment of the present invention includes a fixing bracket 19 and an ear-fixing means. Fixing bracket 19 includes a holding portion 7 that has a locking hole 5 at the upper portion and holds the upper portion, the lower portion, and the outside portion of a curtain airbag 1 and is open to the inside of the car body 3 to unfold an airbag cushion; a guiding portion 9 that is formed of the lower portion extending to the inside of the car body 3 from the lower portion of the holding portion 7 to hold the lower portion of the curtain airbag 1; an outward-extending portion 11 that extends from the inside end portion of the guiding portion toward the car body 3; a downward-extending portion 13 that extends downward from the outside end portion of the outward-extending portion 11; and an inserting portion-to-car body 17 that extends from the lower end portion of the downward-extending portion 13 toward the car body and is inserted in a fixing hole 15 formed at the car body 3. The insertion portion-to-car body 13 comprises a neck 35 and a protrusion portion 40 having at least a protrusion 33

The ear-fixing means fixes an ear 21 of the curtain airbag 1 that passes through the locking hole 5 positioned at the upper portion of the holding portion 7 of the fixing bracket 19.

In this embodiment, the holding portion 7, guiding portion 9, outward-extending portion 11, downward-extending portion 13, and inserting portion-to-car body 17 are integrally formed of a curved panel, that is, by bending a panel.

Holding portion 7 of the fixing bracket has a C-shaped cross-section that is open to the inside of the car body 3, and the guiding portion 9 extending from the lower portion of the holding portion 7 toward the inside of the car body are formed in a simple plate shape facing the inside.

The guiding portion 9 extending from the lower portion of holding portion 7 forms a slope that is inclined down toward the inside. According this configuration, one end of the curtain airbag is held by the upper portion of the holding portion 7 and the other end of the curtain airbag is pressed by the guiding portion 9. Furthermore, the guiding portion 9 of the fixing bracket 19 is sufficiently offset from the distal end of the center pillar trim 23. Accordingly, fixing bracket 19 is mounted as shown in FIG. 2 such that the air cushion can be easily unfolded while opening a head lining 25 without interference from a center pillar trim 23 by overcoming the friction between the curtain airbag and the guiding portion 9 when expanding in a car crash.

The ear-fixing means in this embodiment comprises a cover bracket 27 that covers and contacts one end of the ear 21 to the car body and a fixing bolt 29 that is screwed into the car body through the ear 21 and the cover bracket 27 to fasten the ear 21 to the car body 3.

An ear 21 is a cloth, of which one end is inserted in locking hole 5 of the holding portion 7 and sewn to the upper portion of curtain airbag 1 and the other end is fixed to car body 3 by a cover bracket 27 with a fixing bolt 29, as shown in FIG. 1.

Figure 2:
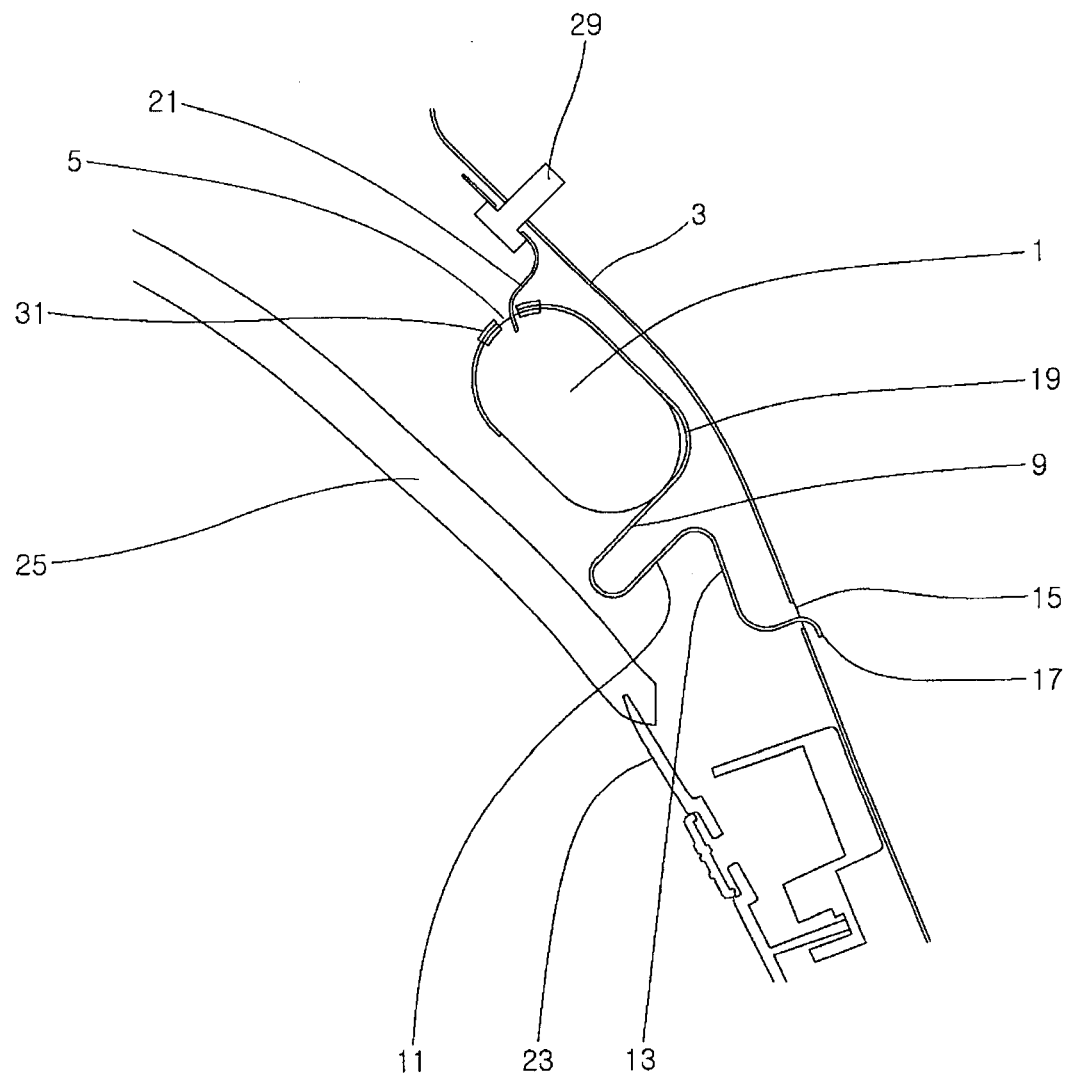
FIG. 2 is a cross-sectional view of a structure for mounting a curtain airbag according to an embodiment of the present invention.
Figure 3:
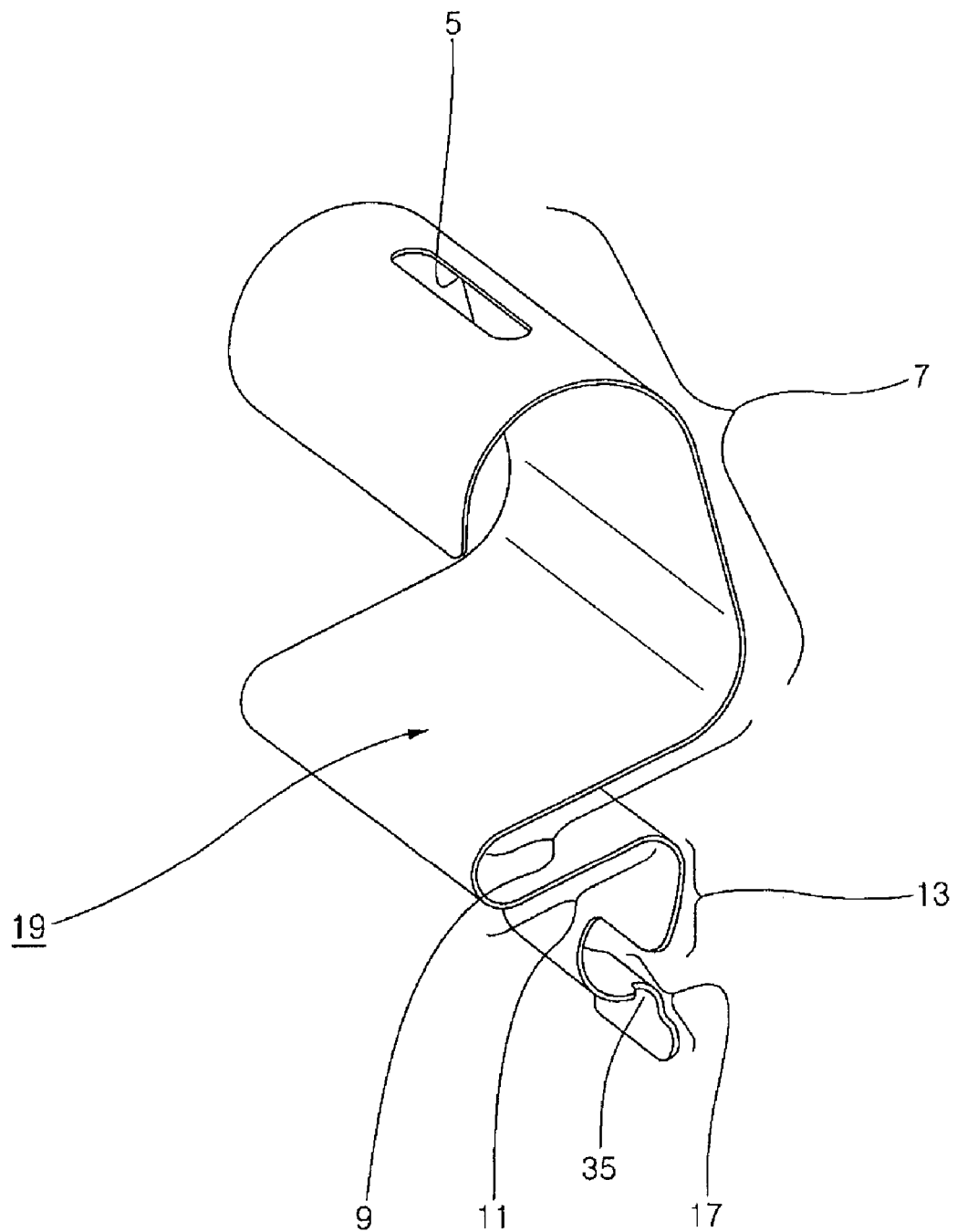
FIGS. 3 and 4 are views showing a fixing bracket shown in FIG. 1.
Figure 4:
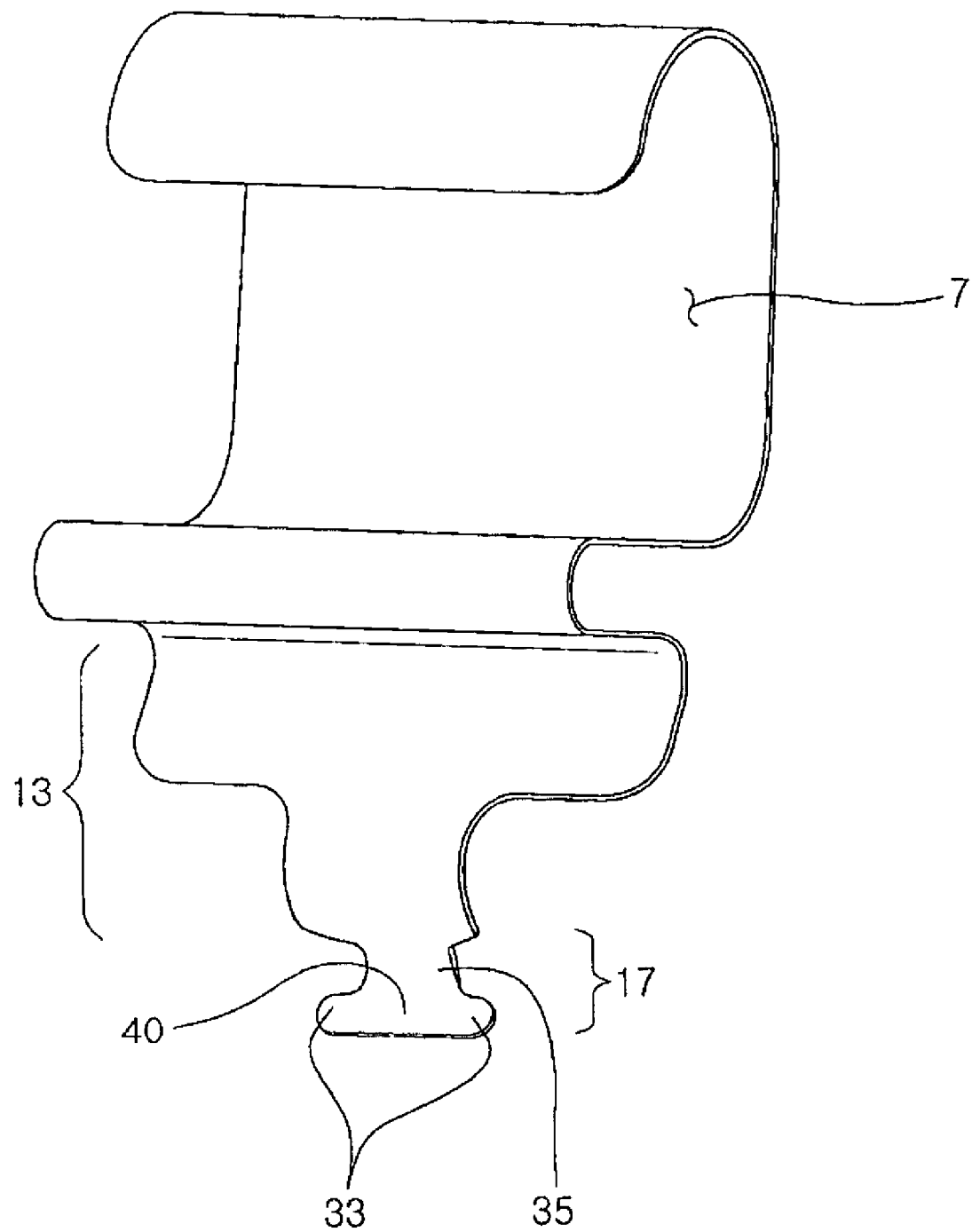

Further, as shown in FIG. 2, it is preferable to dispose at least a shield 31 around locking hole 5 of the holding portion 7 to prevent the ear 21 from being worn off.

The inserting portion-to-car body 17 extending from the end portion of the downward-extending portion 13 comprises a protrusion portion 40 and a neck 35. At least a protrusion 33 is formed at both distal ends of the protrusion portion 40 and a neck 35 that is relatively narrower than the width between the protrusions is formed between the downward-extending portion 13 and the protrusion portion 40. A fixing hole 15 positioned on the car body is formed in a width larger than the width of neck 35 but narrower than the width between the distal ends of the protrusions 33.

In assembling, the neck 35 is inserted in fixing hole 15 by obliquely inserting at first one of protrusions 33 of the protrusion portion 40 into fixing hole 15 and then the inserting portion-to-car body 17 is positioned such that it is movable within a range that is allowed by fixing hole 15 and neck 35.

The forgoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiment were chosen and described in order to explain certain principles of the invention and their practical application, to thereby enable others skilled in the art to make and utilize various exemplary embodiments of the present invention, as well as various alternatives and modifications thereof. It is intended that technical spirit and scope of the present invention be defined by the Claims appended hereto and their equivalents.

What is claimed is:

1. A structure for mounting a curtain airbag to a vehicle, the structure comprising:
   a holding portion of a fixing bracket holding at least a portion of the curtain airbag; and
   an inserting portion-to-car body formed at a lower end portion of the fixing bracket and inserted in a fixing hole formed at a car body;
   wherein the holding portion has a C-shaped cross-section that is open to the inside of the car body, and the lower portion of the holding portion and a guiding portion are formed in a plate shape facing the inside; and wherein the guiding portion is sufficiently offset from a center pillar trim for the curtain airbag to be unfolded without interference from the center pillar trim in expanding.

2. A structure for mounting a curtain airbag to a vehicle the structure comprising:

a holding portion of a fixing bracket holding at least a portion of the curtain airbag; and an inserting portion-to-car body formed at a lower end portion of the fixing bracket and inserted in a fixing hole formed at a car body;

wherein the structure further comprises an ear-fixing means that fixes to the car body an end portion of an ear of the curtain airbag that passes through a locking hole formed at the upper portion of the holding portion of the fixing bracket.

3. The structure as defined in claim 2, wherein the holding portion holds at least a portion of the upper portion, the lower portion, and the outside portion of the curtain airbag and is open to the inside of the vehicle to unfold an airbag cushion.

4. The structure as defined in claim 2, further comprising a guiding portion that extends to the inside of the vehicle from the lower portion of the holding portion and forms a slope that is inclined down toward the inside of the vehicle to hold a lower portion of the curtain airbag.

5. The structure as defined in claim 2, wherein the holding portion has a C-shaped cross-section that is open to the inside of the car body, and the lower portion of the holding portion and a guiding portion are formed in a plate shape facing the inside.

6. The structure as defined in claim 2, wherein the ear-fixing means includes:

a cover bracket that covers and couples the upper portion of the ear to the car body; and a fixing bolt that is screwed into the car body through the ear and the cover bracket and couples the ear and the cover bracket to the car body.

7. The structure as defined in claim 2, wherein at least a shield is disposed around the locking hole of the holding portion to prevent damage to the ear.

8. The structure as defined in claim 2, wherein the fixing bracket further includes:

an outward-extending portion that extends from an inside end portion of the guiding portion toward the car body;

a downward-extending portion that extends downward from an outside end portion of the outward-extending portion; and an inserting portion-to-car body that extends downward from a distal end portion of the downward-extending portion wherein at least a portion of the inserting portion-to-car body is inserted into a fixing hole of the car body.

9. The structure as defined in claim 8, wherein the inserting portion-to-car body comprises a protrusion portion and a neck.

10. The structure as defined in claim 9, wherein at least a protrusion is formed at both distal ends of the protrusion portion;

wherein the neck is formed between the downward-extending portion and the protrusion portion and the width of the neck is relatively narrower than a width between the distal ends of the protrusion portion, and wherein the fixing hole of the car body is formed in a width larger than the width of the neck and narrower than the width between the distal ends of protrusion portion.

11. A structure for mounting a curtain airbag to a vehicle, the structure comprising:

a holding portion of a fixing bracket holding at least a portion of the curtain airbag; and an inserting portion-to-car body formed at a lower end portion of the fixing bracket and inserted in a fixing hole formed at a car body;

wherein the fixing bracket further includes:

an outward-extending portion that extends from an inside end portion of the guiding portion toward the car body;

a downward-extending portion that extends downward from an outside end portion of the outward-extending portion; and an inserting portion-to-car body that extends downward from a distal end portion of the downward-extending portion wherein at least a portion of the inserting portion-to-car body is inserted into a fixing hole of the car body; and wherein the holding portion, outward-extending portion, downward-extending portion, and insertion portion-to-car body are integrally formed by bending a panel.

* * * * *